United States Patent
Turgeman et al.

(10) Patent No.: US 9,407,460 B2
(45) Date of Patent: Aug. 2, 2016

(54) CUT-THROUGH PROCESSING FOR SLOW AND FAST PORTS

(71) Applicant: MARVELL WORLD TRADE LTD., St. Michael (BB)

(72) Inventors: Shira Turgeman, Nirit (IL); Gil Levy, Hod Hasharon (IL); Aviran Kadosh, Misgav (IL)

(73) Assignee: MARVELL WORLD TRADE LTD., St. Michael (BB)

( * ) Notice: Subject to any disclaimer, the term of this patent is extended or adjusted under 35 U.S.C. 154(b) by 85 days.

(21) Appl. No.: 14/220,936

(22) Filed: Mar. 20, 2014

(65) Prior Publication Data
US 2014/0286351 A1    Sep. 25, 2014

Related U.S. Application Data

(60) Provisional application No. 61/906,023, filed on Nov. 19, 2013, provisional application No. 61/803,562, filed on Mar. 20, 2013.

(51) Int. Cl.
*H04L 12/02* (2006.01)
*H04L 12/54* (2013.01)
*H04L 12/861* (2013.01)
*H04L 12/947* (2013.01)

(52) U.S. Cl.
CPC .......... *H04L 12/5689* (2013.01); *H04L 49/252* (2013.01); *H04L 49/90* (2013.01)

(58) Field of Classification Search
None
See application file for complete search history.

(56) References Cited

U.S. PATENT DOCUMENTS

| | | | |
|---|---|---|---|
| 5,140,583 A | | 8/1992 | May et al. |
| 5,491,687 A | * | 2/1996 | Christensen .......... H04L 49/351 370/253 |
| 6,144,668 A | * | 11/2000 | Bass .................. H04L 45/00 370/401 |
| 2003/0026206 A1 | | 2/2003 | Mullendore et al. |
| 2006/0218199 A1 | * | 9/2006 | Kishi .................. G06F 11/106 |
| 2014/0286352 A1 | | 9/2014 | Turgeman et al. |

OTHER PUBLICATIONS

International Search Report and Written Opinion in corresponding International Application No. PCT/IB2014/000847, dated Aug. 29, 2014 (10 pages).

* cited by examiner

*Primary Examiner* — Alex Skripnikov

(57) ABSTRACT

In a method for processing network packets, a network packet is received at an ingress port. After at least a first portion of the network packet has been received, but before the network packet has been completely received, a first data structure representing the network packet is generated based on the first portion, the first data structure is processed, and the network packet begins to be selectively forwarded to a first one or more egress ports, or selectively not forwarded to any egress port, responsively to processing the first data structure. A second data structure representing the network packet is generated and, after the network packet has been completely received, the second data structure is processed, and the network packet is selectively forwarded to a second one or more egress ports, different from the first one or more egress ports, responsively to processing the second data structure.

21 Claims, 6 Drawing Sheets

CUT-THROUGH PROCESSING FOR SLOW AND FAST PORTS

CROSS-REFERENCE TO RELATED APPLICATIONS

This claims the benefit of U.S. Provisional Patent Application No. 61/803,562, entitled "Cut Through Processing for Slow and Fast Ports" and filed on Mar. 20, 2013, and U.S. Provisional Patent Application No. 61/906,023, entitled "Cut Through—Slow to Fast" and filed on Nov. 19, 2013. The disclosures of both of the above-identified applications are hereby incorporated herein by reference.

FIELD OF THE DISCLOSURE

The present disclosure relates generally to networks and, more particularly, to packet processing techniques implemented in network devices.

BACKGROUND

Some types of communications in packet-based networks demand very small latencies in end-to-end transmission time. For some applications, even delays on the order of milliseconds can adversely affect a desired outcome, such as buying or selling a security at a target price. Conventional "store-and-forward" techniques, however, introduce additional latency because the network devices implementing the techniques (e.g., bridge devices) must wait to receive and buffer an entire packet before beginning to forward the packet to a next device. For large packets, this delay can be significant.

One known technique that generally helps to reduce latency is referred to as "cut-through." With cut-through, a network device processes a portion (e.g., a header) of a packet, and begins to forward/transmit the packet to a next device, before the entire packet has been received and written to memory. While cut-through generally reduces latency, conventional cut-through techniques nonetheless suffer from various drawbacks. One such drawback arises because Ethernet protocols generally require a single packet to be transmitted between network devices in a continuous fashion, with breaks or pauses creating an error condition. This can be problematic, for example, when the network device receives a packet on a relatively slow ingress port and forwards the packet to a relatively fast egress port. Because some of the packet that ingresses at a relatively slow port is not yet available in memory when the egress port begins to retrieve the packet data for forwarding/transmission, the egress port may eventually run out of packet data to be transmitted before transmission of the entire packet has been completed. This scenario is generally referred to as "under-run."

Another drawback of conventional cut-through stems from the fact that forwarding is started before the full packet can be processed, and thus certain types of information that may be needed or useful for various, typically non-forwarding, operations are not yet known when the packet is transmitted. For example, a byte count of a received packet, which may be useful for metering and various other operations, may not be known at the time cut-through forwarding begins. As another example, knowledge of whether the received packet is error-free, which may be useful for mirroring and various other operations, may not be known at the time cut-through forwarding begins.

SUMMARY

In one embodiment, a method for processing network packets in a network device includes receiving a network packet at an ingress port of the network device. The method also includes, after at least a first portion of the network packet has been received at the ingress port, but before the network packet has been completely received at the ingress port, generating, at the network device and based on the first portion of the network packet, a first data structure representing the network packet, processing the first data structure at a packet processor of the network device, and selectively beginning to forward the network packet to a first egress port of the network device, or selectively not forwarding the network packet to any egress port, responsively to processing the first data structure. The method also includes generating, at the network device, a second data structure representing the network packet. The method also includes, after the network packet has been completely received at the ingress port, processing the second data structure at the packet processor, and selectively forwarding the network packet to a second egress port of the network device, different from the first egress port, responsively to processing the second data structure.

In another embodiment, a network device includes a plurality of ports, the plurality of ports including an ingress port configured to receive network packets from a network, and a packet processor coupled to the plurality of ports. The packet processor includes a descriptor generator unit configured to, after at least a first portion of a first network packet has been received at the ingress port, but before the first network packet has been completely received at the ingress port, generate, based on the first portion of the first network packet, a first data structure representing the first network packet. The descriptor generator unit is also configured to generate a second data structure representing the first network packet. The packet processor also includes a forwarding module configured to, before the first network packet has been completely received at the ingress port, (i) process the first data structure, and (ii) selectively begin to forward the first network packet to a first egress port of the plurality of ports, or selectively not forward the first network packet to any egress port, responsively to processing the first data structure. The forwarding module is also configured to, after the first network packet has been completely received at the ingress port, (i) process the second data structure, and (ii) selectively forward the first network packet to a second egress port of the plurality of ports, different from the first egress port, responsively to processing the second data structure.

In another embodiment, a method for processing network packets in a network device includes receiving a network packet at an ingress port of the network device. The method also includes, before the network packet has been completely received at the ingress port, generating, at the network device, a first data structure representing the network packet based on a received first portion of the network packet, and processing the first data structure at a packet processor of the network device. Processing the first data structure includes making a forwarding decision for the network packet. The method also includes generating, at the network device, a second data structure representing the network packet. The method also includes, after the network packet has been completely received at the ingress port, performing at least one or more non-forwarding operations with respect to the network packet using at least the second data structure.

In another embodiment, a network device includes a plurality of ports, the plurality of ports including an ingress port configured to receive network packets from a network, and a packet processor coupled to the plurality of ports. The packet processor includes a descriptor generator unit configured to generate, before the first network packet has been completely received at the ingress port, a first data structure based on a received first portion of the first network packet, the first data structure representing the first network packet. The descriptor generator unit is also configured to generate a second data structure representing the first network packet. The packet processor also includes a forwarding module configured to process the first data structure at least by making a forwarding decision for the first network packet, and one or more non-forwarding modules configured to, after the first network packet has been completely received at the ingress port, perform one or more non-forwarding operations with respect to the first network packet using at least the second data structure.

In another embodiment, a method for processing network packets in a network device includes receiving a network packet at an ingress port of the network device, and, before the network packet has been completely received at the ingress port, generating, at the network device, a first data structure representing the network packet based on a received first portion of the network packet. The method also includes processing the first data structure at a packet processor of the network device. Processing the first data structure includes making a first forwarding decision for the network packet using the first data structure to forward the network packet to one or more egress ports. The method also includes, for each of the one or more egress ports, selectively forwarding, or selectively not forwarding, the network packet to the respective egress port according to the first forwarding decision at least based on an operational speed of the respective egress port relative to the ingress port. The method also includes generating, at the network device and after the network packet is completely received at the ingress port, a second data structure representing the network packet. The method also includes processing the second data structure at a packet processor of the network device. Processing the second data structure includes making a second forwarding decision for the network packet using the second data structure to forward the network packet to the one or more egress ports. The method also includes, for each of the one or more egress ports, selectively forwarding, or selectively not forwarding, the network packet to the respective egress port according to the second forwarding decision and an additional input. In some embodiments, selectively forwarding, or selectively not forwarding, the network packet to the respective egress port according to the second forwarding decision and an additional input includes selectively forwarding, or selectively not forwarding, the network packet to the respective egress port according to the second forwarding decision and at least one of (i) an operational speed of the respective egress port relative to the ingress port and (ii) an indicator of which of the one or more egress ports, if any, were forwarded according to the first forwarding decision.

DETAILED DESCRIPTION

Figure 1:
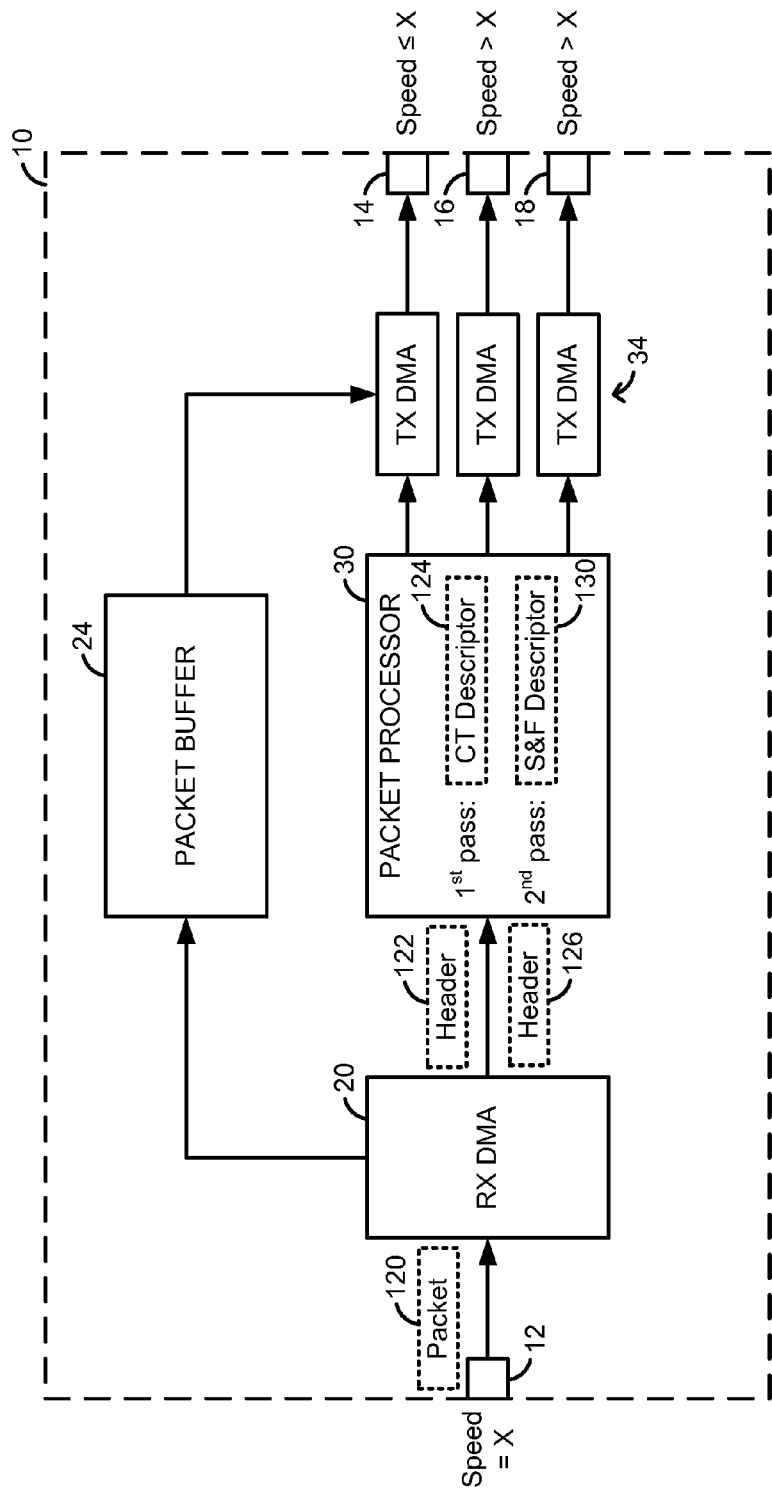
FIG. 1 is a block diagram of an example network device in which packet processing techniques of the present disclosure are implemented, according to an embodiment.

In embodiments described below, a network device (e.g., a bridge, router, switch, or any other suitable network device) receives a packet at an ingress port, writes the received packet to a buffer, and generates and processes two different instances of a descriptor representing the received packet. Before the entire packet is written to the buffer, in an embodiment, the first instance of the descriptor (or "cut-through descriptor") is processed to make a first forwarding decision. In an embodiment, the first forwarding decision is made by identifying one or more target egress ports, and then identifying which of the target egress ports, if any, are suitable for cut-through forwarding. The network device then utilizes cut-through by beginning to forward the (not yet fully buffered) packet only to those target egress ports deemed suitable for cut-through forwarding, in an embodiment.

After the network device has received/buffered the entire packet, in an embodiment, the second instance of the descriptor (or "store-and-forward descriptor") is processed to make a second forwarding decision. In an embodiment, the second forwarding decision is made by again identifying one or more target egress ports, and then identifying which of the target egress ports, if any, were not suitable for cut-through forwarding. The network device then utilizes store-and-forward type forwarding by forwarding the fully buffered packet only to those target egress ports that were not deemed suitable for cut-through forwarding, in an embodiment.

In one embodiment, the network device only generates and/or processes and/or executes an action based on the second instance of the descriptor if the network device was unable to use cut-through to forward the packet to at least one of the target egress ports. In other embodiments and/or scenarios, the network device generates and processes and executes actions based on the second instance of the descriptor regardless of whether the packet still needs to be forwarded to any target egress ports. In one such embodiment and scenario, the network device processes the first instance of the descriptor to make a first forwarding decision, uses cut-through to forward the packet to all target egress ports, and processes the second instance of the descriptor to perform one or more non-forwarding operations that determine and/or utilize information that can only be ascertained (or can only be accurately ascertained) after the full packet is available in the buffer. In various embodiments, for example, the non-forwarding operation(s) include a counting operation that determines a byte count of the full packet, a mirroring operation that utilizes knowledge of whether the full packet contains any errors, etc. In some embodiments, the network device performs a non-forwarding operation for both instances of the descriptor, but performs a different aspect of the non-forwarding operation for each instance. In one embodiment and scenario, for example, a metering operation comprises processing the first instance of the descriptor to perform a metering check (e.g., to determine whether to discard the corresponding packet) but not a metering update, and later processing the second instance of the descriptor to perform a metering update (if the packet was not dropped/discarded) but not a metering check.

FIG. 1 is a highly simplified block diagram of an example network device 10 in which packet processing techniques of the present disclosure are implemented, according to an embodiment. In various embodiments, the network device 10 is a bridge device, router device, switch device, or any other suitable network device configured to operate within a networked environment. The network device 10 includes at least ports 12, 14, 16 and 18. In some embodiments, each of ports 12, 14, 16 and 18 is a bidirectional port that can act as either an ingress port or an egress port. In other embodiments, ports are dedicated to be either ingress ports or egress ports. For instance, port 12 is a dedicated ingress port and ports 14, 16 and 18 are dedicated egress ports, in an embodiment. While FIG. 1 only shows four ports, in other embodiments network device 10 includes more than four ports or less than four ports. In various embodiments, network device 10 is configured to handle unicast, multicast and/or broadcast operation. FIG. 1 illustrates an embodiment in which network device 10 is capable of at least multicast and/or broadcast operation, and a scenario in which a packet ingresses via port 12 and egresses via each of ports 14, 16 and 18 in a multicast or broadcast manner. It is noted that, in other embodiments and/or scenarios, a packet may instead egress via one port (unicast), via two ports, or via more than three ports.

In the example embodiment of FIG. 1, ingress port 12 is coupled to a receive-side direct memory access (Rx DMA) 20. Rx DMA 20 is configured to write packets received via ingress port 12 to a packet buffer 24. In some embodiments, network device 10 includes one or more other Rx DMAs coupled to one or more respective ingress ports not seen in FIG. 1. Additionally or alternatively, in some embodiments, Rx DMA 20 is a channelized Rx DMA associated with a group of two or more ports (that is, ingress port 12 and one or more other ports), where each port within the group is associated with a different DMA context. In various embodiments, packet buffer 24 is a random access memory (RAM), or any other suitable type of memory. In the embodiment shown in FIG. 1, Rx DMA 20 also extracts headers from packets received via ingress port 12, and passes each extracted header to a packet processor 30. In other embodiments, however, a separate unit of network device 10 not seen in FIG. 1 (e.g., a unit disposed between Rx DMA 20 and packet processor 30, or within a pipeline or other architecture of packet processor 30) extracts the headers. In still other embodiments, Rx DMA 20 (or a separate unit of network device 10) provides a different portion of each packet (e.g., only a portion of the packet header) to packet processor 30, or a unit disposed within packet processor 30 extracts the different portion of each packet. For ease of explanation, however, the discussion below will refer to an embodiment in which packet headers are extracted for processing by packet processor 30.

Figure 2:
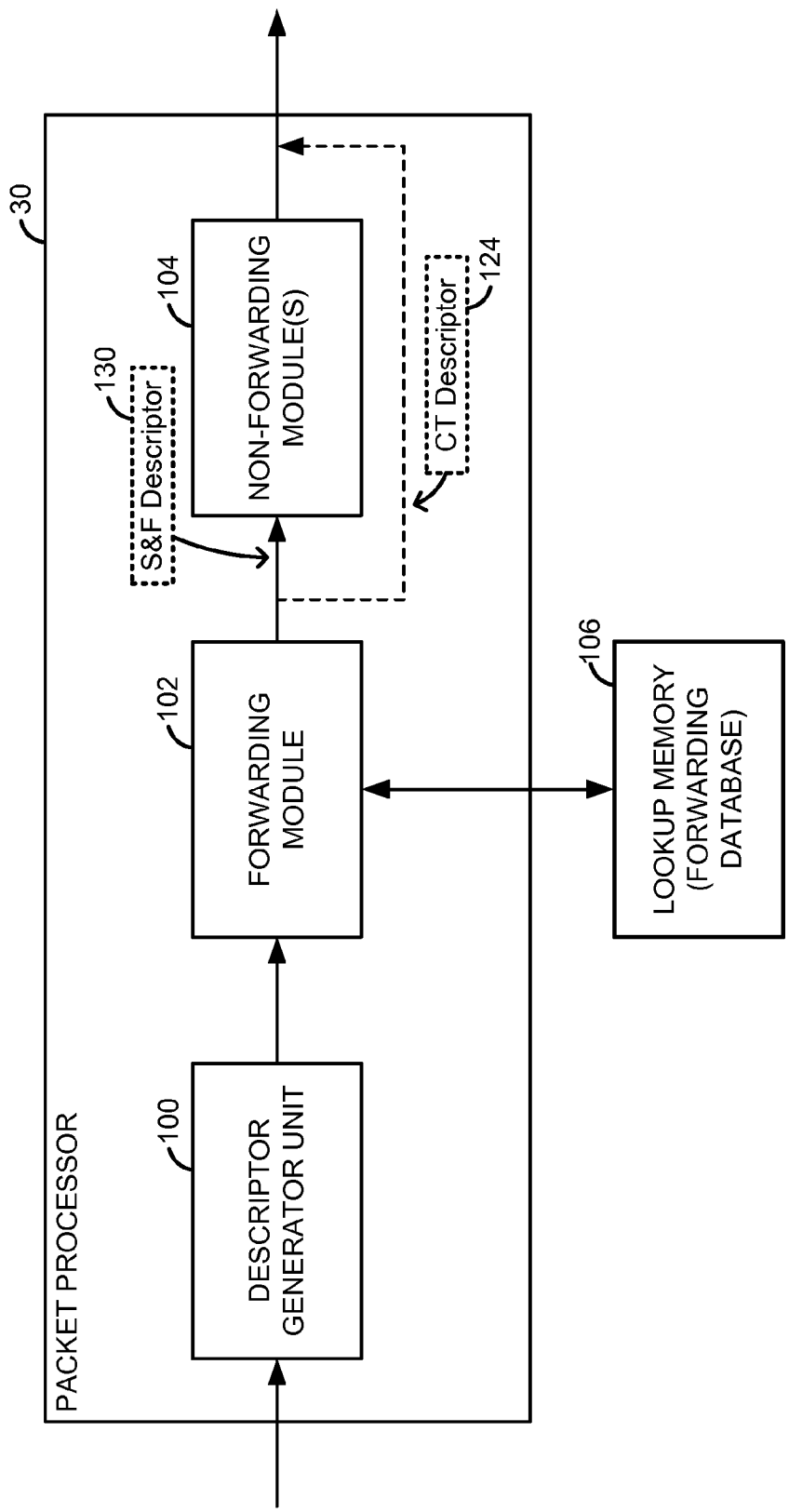
FIG. 2 is a block diagram showing additional detail with respect to the packet processor of FIG. 1, according to an embodiment.

Packet processor 30 uses extracted packet headers to generate descriptors representing the corresponding packets, in an embodiment. Packet processor 30 also includes one or more modules for processing the generated descriptors to perform various operations. A more detailed, but still highly simplified, view of packet processor 30 is provided in FIG. 2, according to one embodiment. As seen in FIG. 2, packet processor 30 includes a descriptor generator unit 100, a forwarding module 102 coupled to the output of descriptor generator unit 100, and one or more non-forwarding modules 104 coupled to the output of forwarding module 102. In some embodiments, one or more other modules (not seen in FIG. 2) are also included in packet processor 30. Generally, the forwarding module 102 (e.g., a bridging engine, in an embodiment) processes descriptors, and accesses a forwarding database in a lookup memory 106, to perform forwarding operations for the corresponding packets. In various embodiments, lookup memory 106 is a ternary content addressable memory (TCAM), a static random access memory (SRAM), a dynamic random access memory (DRAM), or another suitable type of memory. The non-forwarding module(s) 104 process descriptors to perform one or more non-forwarding operations. In some embodiments, the non-forwarding module(s) 104 include one or more modules that perform operations that are not possible, or are of limited usefulness (e.g., less accurate), when the packet has not yet been fully received/buffered and certain types of information (e.g., byte count, whether the packet is error-free or corrupted, etc.) are therefore not known. In one embodiment, for example, non-forwarding module(s) 104 include ingress and/or egress counting engines that determine a packet byte count (or a byte count of a payload portion of the packet, etc.) to be used for billing, generating statistics, or other suitable purposes. Additionally or alternatively, in an embodiment, non-forwarding module(s) 104 include a mirroring engine that determines whether a packet contains errors (e.g., by processing the packet payload and an error detection code within the packet, or by inspecting the result of an earlier error-checking operation, etc.), and enables or causes mirroring of the packet only if the packet does not contain errors.

Generally, the arrows in FIG. 2 show the order of packet processing. While FIG. 2 portrays non-forwarding module(s) 104 as a single component located after forwarding module 102, it is noted that in other embodiments non-forwarding module(s) 104 include various modules distributed throughout the packet path of packet processor 30, and/or non-forwarding module(s) 104 include one or more modules prior to forwarding module 102. In one embodiment, for example, non-forwarding module(s) 104 include an ingress counting engine and/or ingress metering engine prior to forwarding module 102, and an egress counting engine and/or egress metering engine after forwarding module 102. Moreover, in some embodiments, forwarding module 102, and/or one or more modules within non-forwarding module(s) 104, are distributed such that the functionality of the module(s) is/are not strictly before or strictly after other modules of packet processor 30. In one embodiment, for example, forwarding module 102 performs a first function (e.g., a lookup) prior to non-forwarding module(s) 104, and a second function (e.g., analyzing speeds of egress links) after non-forwarding module(s) 104. The operation of the descriptor generator unit 100, the forwarding module 102, and the non-forwarding module(s) 104, according to various embodiments, is described in further detail below.

Packet processor 30 includes one or more tangible/physical processors. In a first embodiment, for example, packet processor 30 is a packet processing pipeline implemented in hardware, such as one or more application-specific integrated circuits (ASICs) or any other suitable type(s) of hardware circuit(s). In one such embodiment, descriptor generator unit 100, forwarding module 102 and/or non-forwarding module(s) 104 are implemented as respective pipeline stages, respective groupings of pipeline stages, or respective portions of pipeline stages within packet processor 30, and the arrows of FIG. 2 represent not only the order of packet processing (which, as noted above, is different in other embodiments), but also the relative placement of the modules within the pipeline.

In a second example embodiment, packet processor 30 includes one or more processors configured to read and execute software or firmware instructions stored on a tangible, non-transitory, computer-readable memory (e.g., a magnetic disk, optical disk, read-only memory (ROM), RAM, etc.), the processors being configured to execute the instructions to perform packet processing operations based on a processing context. In some embodiments, the software or firmware instructions include computer-readable instructions that, when executed by the processor(s), cause the processor(s) to perform any of the various actions of packet processor 30 described herein. In one such embodiment, descriptor generator unit 100, forwarding module 102 and/or non-forwarding module(s) 104 are implemented as respective software or firmware modules, with each module corresponding to instructions executed by packet processor 30. In this embodiment, the order of descriptor generator unit 100, forwarding module 102 and/or non-forwarding module(s) 104 shown in FIG. 2 (which, as noted above, is different in other embodiments) corresponds only to orders of operation rather than physical location (e.g., rather than location within a hardware pipeline).

After being processed by packet processor 30, each descriptor is sent to one or more queues (not seen in FIG. 1) in accordance with the respective forwarding decision made by forwarding module 102, in an embodiment. In some embodiments, each queue is associated with a respective egress port, and buffers descriptors that are to be provided to the respective egress port. In some embodiments, a queue manager (not seen in FIG. 1) sends updates to a scheduler (also not seen in FIG. 1) when queues receive and buffer descriptors, and the scheduler schedules the corresponding packets for transmission via the appropriate egress ports. In one such embodiment, packets are transmitted, in the scheduled order, by sending the queued descriptors to respective transmit DMAs of the egress ports associated with the queues. In some embodiments, each transmit DMA is associated with a single port. In other embodiments, a channelized transmit DMA is associated with a group of ports, with each port being associated with a DMA context. In an embodiment, the transmit DMAs (channelized or non-channelized) are generally configured to retrieve/read the packets stored in packet buffer 24, and to provide the retrieved packets to a corresponding egress port of network device 10. FIG. 1 shows only the three transmit DMAs, collectively Tx DMAs 34, that correspond to egress ports 14, 16 and 18, respectively.

The operation of the various elements of FIGS. 1 and 2, according to one embodiment, will now be described in connection with an example scenario. As noted above, FIG. 1 shows a multicast (or broadcast) scenario in which packet processor 30 forwards a packet received via ingress port 12 to each of egress ports 14, 16 and 18. Also in this embodiment/scenario, and as indicated in FIG. 1, packet data is received at ingress port 12 at a speed "X," transmitted from egress port 14 at a speed less than or equal to X, and transmitted from each of egress ports 16 and 18 at a speed greater than X. In one embodiment, the speed shown for each port is an operational speed of the port. In some embodiments, the operational speed is set by one or more factors, such as a rate and/or mode negotiated between two network devices, for example. In other embodiments, the operational speed is a maximum speed of the port. In other embodiments and/or scenarios, the speed associated with ingress port 12 is also, or instead, dependent at least in part on a speed of the source of the packet (e.g., the speed of the source device, the transmitting port of the source device, etc.), and/or the speeds shown for egress ports 14, 16 and 18 are also, or instead, dependent at least in part on the respective speeds of destinations of the packet (e.g., the speed of the destination device, the receiving port of the destination device, etc.).

Inasmuch as the packet path from ingress port 12 to egress ports 16 and 18 represents a "slow-to-fast" port transition, conventional cut-through techniques can result in under-run. Moreover, conventional techniques for preventing under-run are problematic. For example, some conventional packet processors, when determining that a packet is to be forwarded to a faster egress port, prevent under-run by forcing the faster egress port to wait until the corresponding Tx DMA has retrieved the entire packet from a packet buffer. While this approach may prevent under-run, it also decreases efficient utilization of the egress port. In particular, the network device may be unable to forward other packets to the same egress port (e.g., packets received at other ingress ports of the network device) while a Tx DMA for the egress port waits for the packet to be fully buffered. Other conventional techniques (e.g., allowing newer packets to bypass an initial packet while the Tx DMA waits for the initial packet to be completely buffered) can increase the egress port utilization, but greatly increase the complexity of the Tx DMA and/or the queue manager.

In at least some of the embodiments described herein, however, some or all of the complexity of the conventional techniques is avoided by processing, for at least some received packets, two different instances of the descriptor corresponding to the received packet. Initially, ingress port 12 begins to receive a packet 120 from a network (e.g., from an egress port of another network device not seen in FIG. 1), and provides the packet 120 to Rx DMA 20. In an embodiment, Rx DMA 20 writes portions of the packet 120 to packet buffer 24 as those portions are received at ingress port 12, resulting in portions of the packet 120 being stored in packet buffer 24 before the packet 120 has been received in its entirety.

After Rx DMA 20 has received at least a header of the packet 120, Rx DMA 20 provides a first header copy 122 (e.g., a copy of the header of packet 120 as received at ingress port 12) to packet processor 30, in an embodiment. In other embodiments, the first header copy 122 is provided to packet processor 30 by a different unit of network device 10 (not seen in FIG. 1 or 2), or the first header copy 122 is extracted and/or generated by a unit (also not seen in FIG. 1 or 2) disposed within packet processor 30. Descriptor generator unit 100 of packet processor 30 utilizes the first header copy 122 to generate a cut-through ("CT") descriptor 124, in an embodiment. In one embodiment, the generated CT descriptor 124 is, at least initially, merely the first header copy 122, in which case the unit that generates the first header copy 122 can be viewed as a part of descriptor generator unit 100 within packet processor 30. In other embodiments, the generated CT descriptor 124 includes, at least initially, only some of the information from the first header copy 122, and/or additional information not included in the first header copy 122 (e.g., information to be used only locally, within network device 10, for packet processing). In some embodiments and/or scenarios, the CT descriptor 124 includes one or more pointers to memory locations within packet buffer 24 so that buffered portions of the packet 120 can be processed by packet processor 30.

As ingress port 12 continues to receive the packet 120, and as Rx DMA 20 continues to write the packet 120 to packet buffer 24, the CT descriptor 124 is processed by one or more modules within packet processor 30, in an embodiment. Forwarding module 102 processes the CT descriptor 124 to make a first forwarding decision. In one embodiment, forwarding module 102 makes the first forwarding decision by identifying the target egress port(s) to which packet 120 is to be forwarded, and then identifying which of those target egress ports, if any, are suitable for cut-through forwarding. To identify the target egress port(s), in an embodiment, forwarding module 102 uses information in the CT descriptor 124 (e.g., a media access control (MAC) destination address of the packet 120) as a key to lookup memory 106, which in an embodiment is disposed in an accelerator engine external to the packet processor 30. In the scenario of FIG. 1, forwarding module 102 identifies ports 14, 16 and 18 as target egress ports for the packet 120. In one such embodiment/scenario, forwarding module 102 determines that destination information in the CT descriptor 124 (e.g., a MAC destination address for the packet 120) corresponds to a multicast group that includes ports 14, 16 and 18. In an alternative embodiment/scenario, forwarding module 102 determines that the forwarding database in lookup memory 106 does not include any entries corresponding to the destination information, and therefore decides to broadcast on all ports (including ports 14, 16 and 18) other than ingress port 12.

To determine whether one or more of the target egress ports (here, egress ports 14, 16 and 18) are suitable for cut-through forwarding, in an embodiment, forwarding module 102 compares the operational speeds at which the packet 120 will be egressed via respective ones of egress ports 14, 16 and 18 to the speed at which the packet 120 is received at the ingress port 12. As noted above, the speeds associated with the various ports depend on various different factors, in different embodiments, such as an operational speed of a port and/or a speed at which a source or destination port or device is able to transmit or receive the packet 120. In one embodiment, forwarding module 102 determines that a target egress port is suitable for cut-thorough forwarding only if the target egress port will egress the packet 120 slower than, or at the same speed that, the packet 120 is received at ingress port 12. In the embodiment and scenario of FIG. 1, therefore, forwarding module 102 determines that only egress port 14 is suitable for cut-through forwarding. In an embodiment, forwarding module 102 modifies the CT descriptor 124 to indicate that the packet 120 is to be forwarded only to egress port 14. In some embodiments, forwarding module 102 initially modifies the CT descriptor 124 to identify all target egress ports (here, egress ports 14, 16 and 18), and then, after comparing port/link speeds, further modifies the CT descriptor 124 to indicate only those target egress port for which cut-through forwarding is appropriate (here, egress port 14). In either of these embodiments, the processed CT descriptor 124 ultimately includes data indicative of the first forwarding decision.

In some embodiments, network device 10 reduces the amount of time needed to make the first forwarding decision by arranging egress ports, by speed, in strictly ascending or strictly descending order (e.g., within a list stored in a memory such as lookup memory 106). In one such embodiment, forwarding module 102 first compares the speed associated with the slowest target egress port to the speed at which ingress port 12 receives the packet 120, then compares the speed associated with the next slowest target egress port to the speed at which ingress port 12 receives the packet 120, etc., until the first time that a target egress port is determined to be associated with a speed too fast for cut-through forwarding. Because the egress ports are arranged in strictly ascending or strictly descending order by speed, in this embodiment, forwarding module 102 will at that point have implicitly determined that any remaining target egress ports are likewise unsuitable for cut-through forwarding.

In some embodiments, packet processor 30 includes one or more additional modules (not seen in FIG. 2) that process the CT descriptor 124 before and/or after processing by forwarding module 102, such as ingress and/or egress policy engines, for example. In an embodiment, however, the CT descriptor 124 bypasses non-forwarding module(s) 104, as shown by the dashed line of FIG. 2, in order to avoid wasting time and/or resources by attempting to perform operations that require knowledge of the full packet 120. In one such embodiment, the CT descriptor 124 includes a flag or other indicator with a value indicating that it is a first descriptor instance intended for cut-through processing, and each module of non-forwarding module(s) 104 does not process the CT descriptor 124 in response to the module determining the flag value. In an embodiment in which non-forwarding module(s) 104 include a counting engine that determines a byte count of packet 120, for example, the counting engine is selectively bypassed for the CT descriptor 124.

It is noted that, in some embodiments, the CT descriptor 124 bypasses only a portion of a particular module, in which case the non-forwarding module(s) 104 of FIG. 2 corresponds to one or more sub-modules of each partially bypassed module(s). In one embodiment in which a metering engine includes a packet counter engine and a packet byte counter engine, for example, and in which the CT descriptor 124 bypasses the packet byte counter engine but not the packet counter engine, the non-forwarding module(s) 104 of FIG. 2 includes the packet byte counter engine but not the packet counter engine. Moreover, the manner in which non-forwarding module(s) 104 are bypassed depends on the architecture of packet processor 30. In one embodiment in which packet processor 30 is a hardware pipeline, for example, packet processor 30 causes the CT descriptor 124 to bypass non-forwarding module(s) 104 by directing the CT descriptor 124 to a physical path that avoids the pipeline stage(s) corresponding to non-forwarding module(s) 104. In another embodiment, in which packet processor 30 is a processor executing instructions in a "run-to-completion" architecture, packet processor 30 causes the CT descriptor 124 to bypass non-forwarding module(s) 104 simply by deciding not to execute the instructions corresponding to non-forwarding module(s) 104.

After processing the CT descriptor 124, in an embodiment, packet processor 30 sends the CT descriptor 124 to a queue (not seen in FIG. 1) associated with egress port 14. When the packet 120 is scheduled for transmission, in an embodiment, the queue provides the CT descriptor 124 to the DMA, of Tx DMAs 34, associated with egress port 14. In an embodiment, packet processor 30 (or a scheduler, or other unit of network device 10, that is separate from packet processor 30, etc.) identifies the appropriate queue and/or DMA by examining the information, in CT descriptor 124, that represents the first forwarding decision (e.g., a field of CT descriptor 124 identifying egress port 14). In an embodiment, the DMA associated with egress port 14 then begins to provide portions of the packet 120 to egress port 14, for transmission to the destination device, before packet 120 has been completely received at ingress port 12. In one embodiment, the DMA provides the portions of the packet 120 to egress port 14 substantially as those packet portions become available in packet buffer 24. Because egress port 14 does not transmit the packet 120 faster than ingress port 12 receives the packet 120, under-run is not a concern, in some embodiments.

Once ingress port 12 fully receives the packet 120 and packet 120 is written to packet memory 24, in an embodiment, Rx DMA 20 provides a second header copy 126 to packet processor 30. In other embodiments, the second header copy 126 is provided to packet processor 30 by a different unit of network device 10 (not seen in FIG. 1 or 2), or the second header copy 126 is extracted and/or generated by a unit (also not seen in FIG. 1 or 2) disposed within packet processor 30. In some alternative embodiments (e.g., where there is a significant delay in writing received packet data to packet memory 24), the Rx DMA 20 (or other unit) generates and/or provides the second header copy 126 to packet processor 30, or packet processor 30 generates the second header copy 126, at a time after ingress port 12 has fully received the packet 120, but slightly before the packet 120 is written to packet memory 24. In an embodiment, the second header copy 126 is the same as the first header copy 122 (e.g., both are copies of the header of packet 120 as received at ingress port 12).

Descriptor generator unit 100 of packet processor 30 utilizes the second header copy 126 to generate a store-and-forward ("S&F") descriptor 130, in an embodiment. In some embodiments, the generated S&F descriptor 130 is generated in the same manner as CT descriptor 124, and therefore initially contains the same data that CT descriptor 124 contained prior to processing by packet processor 30. In one embodiment, however, CT descriptor 124 is initially generated to contain a flag indicating that it was the first descriptor instance (as discussed above), and S&F descriptor 130 is generated to contain a flag indicating that it is the second descriptor instance. In other embodiments, S&F descriptor 130 also, or instead, differs from CT descriptor 124 in other ways, such as containing more, fewer and/or different fields than CT descriptor 124, for example. In one embodiment, for example, S&F descriptor 130 includes a byte count that is not included in CT descriptor 124.

Once generated, the S&F descriptor 130 is processed by one or more modules within packet processor 30. In some embodiments, forwarding module 102 processes S&F descriptor 130 to make a second forwarding decision. In one embodiment, forwarding module 102 makes the second forwarding decision by once again identifying the target egress port(s) to which packet 120 is to be forwarded, and then identifying which of those target egress ports, if any, are unsuitable (too fast) for cut-through forwarding. In an embodiment, forwarding module 102 identifies the target egress port(s) in the same manner used for the first forwarding decision, but by using the corresponding information (e.g., destination MAC address) in the S&F descriptor 130 rather than the CT descriptor 124. In some embodiments and/or scenarios, because both CT descriptor 124 and S&F descriptor 130 represent the same packet 120 and include the same information for making a forwarding decision, the second forwarding decision is the same as the first forwarding decision despite S&F descriptor 130 being processed, in some embodiments, independently of the processing of CT descriptor 124. In one embodiment, for example, forwarding module 102 identifies the same target egress port(s) for both the first forwarding decision and the second forwarding decision.

To determine which of the target egress ports (here, egress ports 14, 16 and 18) are unsuitable for cut-through forwarding, in an embodiment, forwarding module 102 again compares the speeds at which the packet 120 will be egressed via each of egress ports 14, 16 and 18 to the speed at which the packet 120 is received at the ingress port 12. In one such embodiment, forwarding module 102 determines that the packet 120 should be forwarded to a particular target egress port only if the target egress port will egress the packet 120 at a rate faster than the packet is received at ingress port 12.

In an embodiment, forwarding module 102 modifies the S&F descriptor 130 to indicate that the packet 120 is to be forwarded only to egress ports 16 and 18. In some embodiments, forwarding module 102 initially modifies the S&F descriptor 130 to identify all target egress ports (here, egress ports 14, 16 and 18), and then, after comparing port/link speeds, further modifies the S&F descriptor 130 to indicate only those target egress ports to which the packet 120 should still be forwarded (here, egress ports 16 and 18). In either of these embodiments, the processed S&F descriptor 130 ultimately includes data indicative of the second forwarding decision.

In some embodiments, the S&F descriptor 130 is also processed by one or more modules of packet processor 30, not seen in FIG. 2, that had earlier processed the CT descriptor 124, such as ingress and/or egress policy engines, etc. Whereas the CT descriptor 124 bypassed non-forwarding module(s) 104, however, non-forwarding module(s) 104 process the S&F descriptor 130, in an embodiment. In one such embodiment, the S&F descriptor 130 includes a flag or other indicator with a value indicating that it is the second descriptor instance, and each module of non-forwarding module(s) 104 processes the S&F descriptor 130 in response to the module detecting the flag value. In an embodiment in which non-forwarding module(s) 104 include a counting engine that determines a byte count of packet 120, for example, the counting engine is bypassed for CT descriptor 124, but performs a byte counting operation when processing S&F descriptor 130. The manner in which the processing of non-forwarding module(s) 104 is applied to S&F descriptor 130 depends on the architecture of packet processor 30. In one embodiment in which packet processor 30 is a hardware pipeline, for example, packet processor 30 causes non-forwarding module(s) 104 to process the S&F descriptor 130 by physically directing the S&F descriptor 130 to an input (or inputs) of the pipeline stage(s) corresponding to non-forwarding module(s) 104. In another embodiment, in which packet processor 30 is a processor executing instructions in a "run-to-completion" architecture, packet processor 30 causes non-forwarding module(s) to process the S&F descriptor 130 simply by deciding to execute the instructions corresponding to non-forwarding module(s) 104.

After processing the S&F descriptor 130, in an embodiment, packet processor 30 provides the S&F descriptor 130 to queues (not seen in FIG. 1) associated with egress ports 16 and 18. When the packet 120 is scheduled for transmission via egress port 16, in an embodiment, the respective queue provides the S&F descriptor 130 to the DMA, of Tx DMAs 34, associated with egress port 16. Similarly, in an embodiment, when the packet 120 is scheduled for transmission via egress port 18, the respective queue provides the S&F descriptor 130 to the DMA, of Tx DMAs 34, associated with egress port 18. In an embodiment, packet processor 30 identifies the appropriate queues and/or DMAs by examining the information, in S&F descriptor 130, that represents the second forwarding decision. In an embodiment, the DMAs associated with egress ports 16 and 18 then begin to provide portions of the packet 120 to the respective egress ports. Because the packet 120 is fully buffered in packet buffer 24 by this time, the relatively fast speeds of egress ports 16 and 18 do not create a risk of under-run, in some embodiments.

In some embodiments, the second header copy 126 is not generated and provided to packet processor 30, the S&F descriptor 130 is not generated, and/or the S&F descriptor 130 is not processed by the packet processor 30 if the first forwarding decision (made by processing CT descriptor 124) resulted in a received packet being forwarded to all target egress ports. In other embodiments, the S&F descriptor 130 is generated and processed by packet processor 30 regardless of whether the first forwarding decision resulted in a received packet being forwarded to all target egress ports. It is noted that with conventional cut-through techniques, it is generally not possible to perform packet processing operations that require information that can only be obtained (or can only be accurately or confidently obtained) after the full packet is written to packet buffer 24, such as byte counting and error-checking. By processing the S&F descriptor 130 regardless of whether any packet forwarding remains to be done after the first forwarding decision, however, network device 10 can, in some embodiments, perform such packet processing operations regardless of whether cut-through, store-and-forward, or (in multicast or broadcast) both types of forwarding are used for a given packet.

In some embodiments, network device 10 does not utilize cut-through for relatively short packets. In one embodiment, for example, the first header copy 122 is not provided to (or generated within) packet processor 30, CT descriptor 124 is not generated, CT descriptor 124 is not processed by packet processor 30, and/or one or more actions are not executed based on CT descriptor 124 if the packet received at ingress port 12 is below a threshold packet length (e.g., a threshold total packet length, a threshold length of a packet payload, or another suitable threshold). In one such embodiment, only S&F descriptor 130 is generated and processed if packet 120 is shorter than the threshold packet length.

While FIGS. 1 and 2 have to this point been described with respect to an embodiment in which the CT descriptor 124 bypasses non-forwarding module(s) 104, it is noted that, in some embodiments, non-forwarding module(s) 104 instead, or additionally, include one or more modules that process both the CT descriptor 124 and the S&F descriptor 130, but apply different portions of the processing operation(s) for each descriptor. In one such embodiment, non-forwarding module(s) 104 include a metering module (e.g., a metering engine) that is used to support Service Level Agreement (SLA) enforcement (e.g., by applying traffic limiting, in an embodiment). Two different embodiments in which non-forwarding module(s) 104 include a metering module will now described with reference to FIGS. 1 and 2. Both embodiments are described with reference to an embodiment and/or scenario in which network device 10 is configured such that metering at a certain rate (e.g., 10 gigabits per second (Gbps), 40 Gbps, etc.) is applied to traffic received at ingress port 12, a first traffic class ("Traffic Class A") is configured to use cut-through forwarding, and a second traffic class ("Traffic Class B") is configured to use store-and-forward type forwarding, with both traffic classes being enabled for ingress port metering. In an embodiment, packet processor 30 classifies packets to determine the traffic class (e.g., using a traffic classification module not seen in FIG. 2).

In the first embodiment, traffic configured to use cut-through forwarding is not subjected to a metering policy implemented by the metering module, but traffic that is configured to use store-and-forward type forwarding, and shares the same meter as the cut-through traffic, is subjected to the metering policy. In a scenario in which packet 120 is received at ingress port 12 and is determined to be a Traffic Class A (cut-through) packet, in one embodiment, the CT descriptor 124 bypasses the metering module (e.g., as seen in FIG. 2) and is therefore forwarded without checking the meter state, but the metering module performs a metering update (e.g., based on the length of packet 120) when processing the S&F descriptor 130. In a different scenario in which packet 120 is received at ingress port 12 and determined to be a Traffic Class B (store-and-forward) packet, in one embodiment, the metering module of non-forwarding module(s) 104 provides standard metering functionality. In one embodiment, for example, the metering module processes the S&F descriptor 130 to perform a metering conformance level check and, if needed based on the metering check (e.g., if it is determined that the packet 120 is to be forwarded), to perform a metering update (e.g., by updating a meter bucket based on the length of packet 120). In various embodiments, in this scenario, the CT descriptor 124 is not generated and/or processed for packet 120 due to the traffic class of packet 120, or the CT descriptor 124 is generated and processed but bypasses the metering module (e.g., as seen in FIG. 2).

In the second embodiment, cut-through traffic is subjected to a metering policy implemented by the metering module (e.g., the same metering policy applied to store-and-forward traffic, in an embodiment). In a scenario in which packet 120 is determined to be a Traffic Class A (cut-through) packet, in an embodiment, the metering module processes the CT descriptor 124 by performing a metering check, but does not perform a metering update based on the processing of CT descriptor 124 because the length of packet 120 is not yet known. In one embodiment, the packet 120 is forwarded (according to the first forwarding decision made by forwarding module 102 when processing CT descriptor 124) or discarded according to the meter state of the metering module, and/or according to a configuration of a forward/drop per meter state. In an embodiment, the metering module saves the last forward/drop indication per source port for Traffic Class A in the meter. After the CT descriptor 124 has been processed, in an embodiment, the metering module performs a metering update (e.g., updating a meter bucket according to the length of packet 120) using the S&F descriptor 130, but does not perform a second metering check based on the processing of S&F descriptor 130. In some embodiments, the metering module performs the metering update using the S&F descriptor 130 only if the packet 120 was forwarded in response to the processing of CT descriptor 124, rather than being dropped/discarded. In a scenario in which packet 120 is instead determined to be a Traffic Class B (store-and-forward) packet, in an embodiment, the metering module of non-forwarding module(s) 104 provides standard metering functionality. In one embodiment, for example, the metering module processes the S&F descriptor 130 to perform both a metering conformance level check and, if needed based on the metering check (e.g., if it is determined that the packet 120 is to be forwarded rather than dropped), a metering update (e.g., updating a meter bucket according to the length of packet 120). In various embodiments, in this scenario, the CT descriptor 124 is not generated and/or processed for packet 120 due to its traffic class, or the CT descriptor 124 bypasses the metering module (e.g., as seen in FIG. 2).

Figure 3:
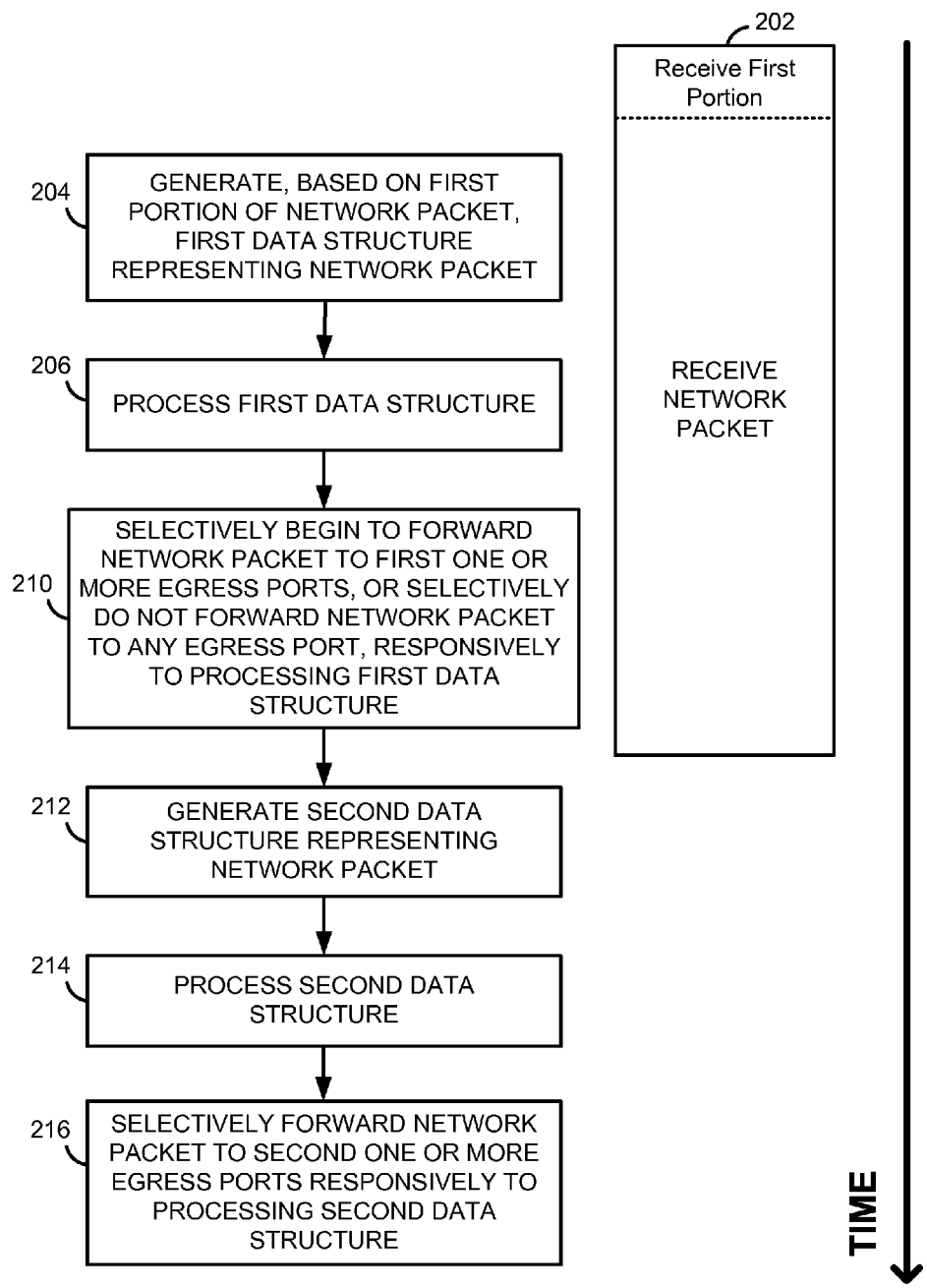
FIG. 3 is a flow diagram of an example method for processing network packets in a network device, according to an embodiment.

FIG. 3 is a flow diagram of an example method 200 for processing network packets in a network device, according to an embodiment. In an embodiment, the method 200 is implemented by network device 10 of FIG. 1. The vertical arrow on the right-hand side of FIG. 3 represents time, with time progressing in the downward direction. Despite being represented by distinct blocks, the operations corresponding to the blocks on the left-hand side of FIG. 3 are not necessarily distinct in time. In some embodiments, for example, the operation(s) of block 206 overlap with the operation(s) of block 210, and/or the operation(s) of block 212 overlap with the operation(s) of block 216, etc.

At block 202, a network packet (i.e., a packet communicated via a network) is received at an ingress port of the network device, such as ingress port 12 of FIG. 1, for example. In an embodiment, receiving the network packet includes writing the network packet (e.g., using a DMA) to a packet buffer, such as packet buffer 24 of FIG. 1, for example. Initially, a first portion of the network packet is received, which in various embodiments is a header of the network packet, a portion of a header, etc.

At block 204, a first data structure representing the network packet is generated based on the first portion (e.g., header) of the network packet received at the beginning of block 202. As seen in FIG. 3, in the embodiment of method 200, block 204 occurs after at least the first portion of the network packet has been received, but before the network packet has been completely received at the ingress port. In an embodiment, block 204 is implemented by a descriptor generator unit such as descriptor generator unit 100 of FIG. 2, for example. In some embodiments, the first data structure is a packet descriptor, such as CT descriptor 124 of FIG. 1, for example. In various embodiments, the first data structure is generated by copying or parsing the first portion of the packet, by processing the first portion of the packet to create different data fields, and/or in another suitable manner. In some embodiments, the first data structure includes pointers to one or more memory locations in a packet buffer configured to store the network packet.

In some embodiments, the first data structure is generated to include a flag or other indicator to indicate that the first data structure is the first instance of a descriptor representing the network packet. In some embodiments, the indicator is simply a single bit, with the binary value indicating that the first data structure is a first instance of a descriptor associated with the network packet.

At block 206, the first data structure generated at block 204 is processed at a packet processor of the network device. As seen in FIG. 3, in the embodiment of method 200, block 206 occurs before the network packet has been completely received at the ingress port. In an embodiment, block 206 is implemented by a forwarding module such as forwarding module 102 of FIG. 2, for example. In some embodiments, the first data structure is processed at least to make a first forwarding decision. In one such embodiment, destination information contained in the first data structure (or pointed to by the first data structure, etc.), such as a destination MAC address of the network packet, is used as a key to a forwarding database stored in a memory, such as lookup memory 106 of FIG. 2, for example. In one embodiment and scenario, one or more entries in the forwarding database associate the destination information with one a single target egress port (unicast), or multiple target egress ports (multicast), to which the network packet is to be forwarded. In another embodiment and scenario, no entries in the forwarding database associate the destination information with an egress port, and in response the first forwarding decision specifies that the network packet is to be broadcast (e.g., to all ports other than the ingress port at which the network packet is received, in an embodiment).

In some embodiments, the first forwarding decision is made not only by determining the target egress port(s), but also by determining which of those target egress ports, if any, is suitable for cut-through forwarding. In one such embodiment, the latter determination is made by determining which of the target egress ports, if any, is associated with an egress link having a speed less than or equal to a speed at which the network packet is received at the ingress port. In various embodiments, the egress link speeds are dependent on the respective target egress ports (e.g., operational speeds of the ports), a destination port and/or device to which the target egress port is directly or indirectly coupled, and/or other suitable factors.

In an embodiment, processing the first data structure at block 206 also includes modifying the first data structure (e.g., overwriting, and/or adding, one or more descriptor fields) to include information representing the first forwarding decision. In one embodiment, for example, the first data structure is modified to include an indicator of the target egress ports that are suitable for cut-through forwarding, if any.

At block 210, the network packet begins to be selectively forwarded to a first one or more egress ports, or is selectively not forwarded to any egress port, responsively to processing the first data structure at block 206. As seen in FIG. 3, in the embodiment of method 200, block 206 occurs before the network packet has been completely received at the ingress port. Naturally, however, the forwarding process that begins at block 210 does not end until a time after the network device has received and buffered the entire network packet in block 202. In an embodiment, the selective forwarding (or lack thereof) is in accordance with the first forwarding decision described above in connection with block 206. Thus, in this embodiment, the network packet is forwarded only to those egress ports that were determined at block 206 to be target egress ports, and to be suitable (e.g., slow enough) for cut-through forwarding. In some embodiments, the network packet is forwarded to the first one or more egress ports at block 210, if forwarded at all, at least in part by sending the first data structure (now containing information representing the first forwarding decision) to each DMA associated with an egress port of the first one or more egress ports. In an embodiment, blocks 206 and 210 are both implemented by a forwarding module, such as forwarding module 102 of FIG. 2, for example.

At block 212, a second data structure representing the network packet is generated. As seen in FIG. 3, in the embodiment of method 200, block 212 occurs after the network packet has been completely received at the ingress port. In other embodiments, however, block 212 occurs before the network packet has been completely received, or partially before and partially after the network packet has been completely received. In an embodiment, block 212 is implemented by a descriptor generator unit such as descriptor generator unit 100 of FIG. 2, for example (e.g., a same descriptor generator unit that generated the first data structure at block 204, in an embodiment). In some embodiments, the second data structure is generated in the same manner as the first data structure (e.g., based on the first portion of the network packet) and, because both data structures represent the same network packet, the newly generated second data structure is the same as, or nearly the same as, the newly generated first data structure. In one such embodiment, the second data structure only differs from the first data structure after the respective processing at block 206 (discussed above) or block 214 (discussed below). In other embodiments, however, the second data structure generated at block 212 initially differs from the first data structure generated at block 204 at least to the extent that each data structure includes a respective indicator specifying whether the data structure is the first instance or the second instance of a descriptor representing the network packet. In one embodiment, for example, the first data structure is generated to include a one-bit "INSTANCE" field with a value of "0," and the second data structure is generated to include the one-bit "INSTANCE" field with a value of "1." In still other embodiments, the second data structure is also, or instead, generated to include other information about the network packet (e.g., a byte count) that was not included in the first data structure generated at block 204, and/or vice versa.

At block 214, the second data structure generated at block 212 is processed at the packet processor. As seen in FIG. 3, in the embodiment of method 200, processing the second data structure at block 214 occurs after the network packet has been completely received at the ingress port. In an embodiment, block 214 is implemented by a forwarding module such as forwarding module 102 of FIG. 2, for example. In one embodiment, the processing at block 214 occurs selectively in response to determining that the network packet has not yet been forwarded to all target egress ports. In an alternative embodiment, the processing at block 214 occurs automatically, regardless of whether the network packet has yet been forwarded to all target egress ports.

In some embodiments, the second data structure is processed at least to make a second forwarding decision. Initially, in one such embodiment, the second data structure is processed to determine the target egress port(s) for the network packet. In an embodiment, because the first data structure and second data structure represent the same network packet (e.g., contain, or point to, the same destination information), the processing at block 214 identifies the same target egress port(s) that were identified at block 206. Whereas the first forwarding decision at block 206 determined which target egress ports (if any) were suitable for cut-through forwarding, however, the second forwarding decision determines at least which target egress ports (if any) are associated with egress links that are too fast for cut-through forwarding, in an embodiment. In one embodiment, for example, the second forwarding decision is made by determining which of the target egress ports, if any, is associated with an egress link having a speed greater than a speed at which the network packet is received at the ingress port. In another embodiment, the second forwarding is also, or instead, made based on an indicator of which of the target egress ports, if any, the network packet was forwarded to according to the first forwarding decision.

In an embodiment, processing the second data structure at block 214 also includes modifying the second data structure (e.g., overwriting, and/or adding, one or more descriptor fields) to include information representing the second forwarding decision. In one embodiment, for example, the second data structure is modified to include an indicator of the target egress ports that are not suitable for cut-through forwarding, if any.

The method 200 corresponds to a scenario in which at least one target egress port being unsuitable for cut-through forwarding, and the second forwarding decision at block 214 therefore results in at least one egress port being identified for forwarding. Accordingly, at block 216, the network packet is selectively forwarded to a second one or more egress ports, different from the first one or more egress ports (that is, if the network packet was forwarded to the first one or more egress ports at block 210), responsively to processing the second data structure at block 214. In another example method corresponding to a different scenario, the network packet is selectively forwarded to a first one or more egress ports at block 210, and is selectively not forwarded to any egress port at block 216. As seen in FIG. 3, in the embodiment of method 200, block 216 occurs after the network packet has been completely received at the ingress port. In an embodiment, blocks 214 and 216 are both implemented by a forwarding module such as forwarding module 102 of FIG. 2, for example (e.g., the same forwarding module as blocks 206 and 210, in an embodiment).

In an embodiment, the selective forwarding at block 216 is in accordance with the second forwarding decision described above in connection with block 210. Thus, in this embodiment, the network packet is forwarded only to those egress ports that were (at block 214) both determined to be target egress ports, and determined to be unsuitable for cut-through forwarding. In some embodiments, the network packet is forwarded to the second one or more egress ports at block 216 at least in part by sending the second data structure (now containing information representing the second forwarding decision) to DMAs associated with each egress port of the second one or more egress ports.

In some embodiments, the method 200 includes a first additional block, not seen in FIG. 3, in which a non-forwarding operation is selectively not performed on the first data structure, and a second additional block, also not seen in FIG. 3, in which the non-forwarding operation is selectively performed on the second data structure. In various embodiments, for example, the first additional block occurs before block 206, after block 206, or in a manner that overlaps or is interspersed with block 206, and the second additional block occurs before block 214, after block 214, or in a manner that overlaps or is interspersed with block 214. In different embodiments, for example, the non-forwarding operation generally processes descriptors to determine byte counts of the corresponding network packets, and/or determines whether the corresponding network packets contain errors. In some embodiments, the non-forwarding operation is a counting operation that determines byte counts, a mirroring operation that selectively mirrors, or selectively does not mirror, the corresponding network packets based on whether the network packets contain errors, etc. In an embodiment, the non-forwarding operation is bypassed when processing the first data structure based on an indicator in the first data structure (e.g., an indicator of the type discussed above in connection with block 204), and is not bypassed when processing the second data structure based on a similar indicator in the second data structure (e.g., an indicator of the type discussed above in connection with block 212). In some embodiments, one or more other non-forwarding operations are also selectively bypassed when processing the first data structure, but performed when processing the second data structure (e.g., also based on indicators in the first and second data structures).

In other embodiments, the method 200 also, or alternatively, includes one or more other additional blocks not seen in FIG. 3. In one embodiment, for example, the method 200 includes one or more additional blocks, between blocks 206 and 210, in which the network packet is stored to one or more queues and/or scheduled for transmission via the respective egress port(s). In another embodiment, the method 200 also, or alternatively, includes an additional block, prior to block 202, in which it is determined whether the network packet has a length that is less than a threshold value (e.g., a threshold total packet length, a threshold length of a packet payload portion, or another suitable threshold). In one such embodiment, blocks 204, 206 and 210 are performed only if it is determined that the network packet length does not fall below the threshold value. In another embodiment, blocks 206 and 210 are performed only if it is determined that the network packet length does not fall below the threshold value.

Figure 4:
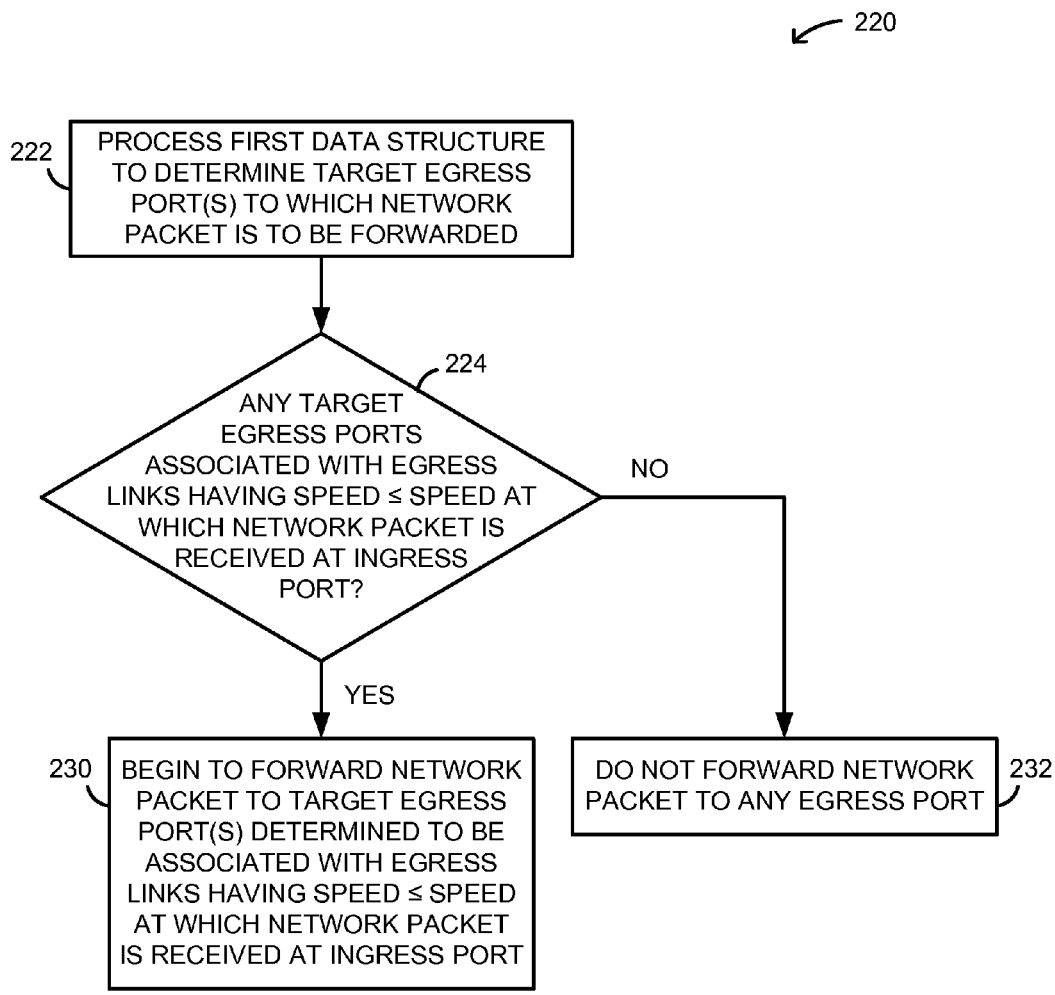
FIG. 4 is a flow diagram of an example method for processing a first data structure representing a network packet, and selectively forwarding or not forwarding the network packet, according to an embodiment.
Figure 5:
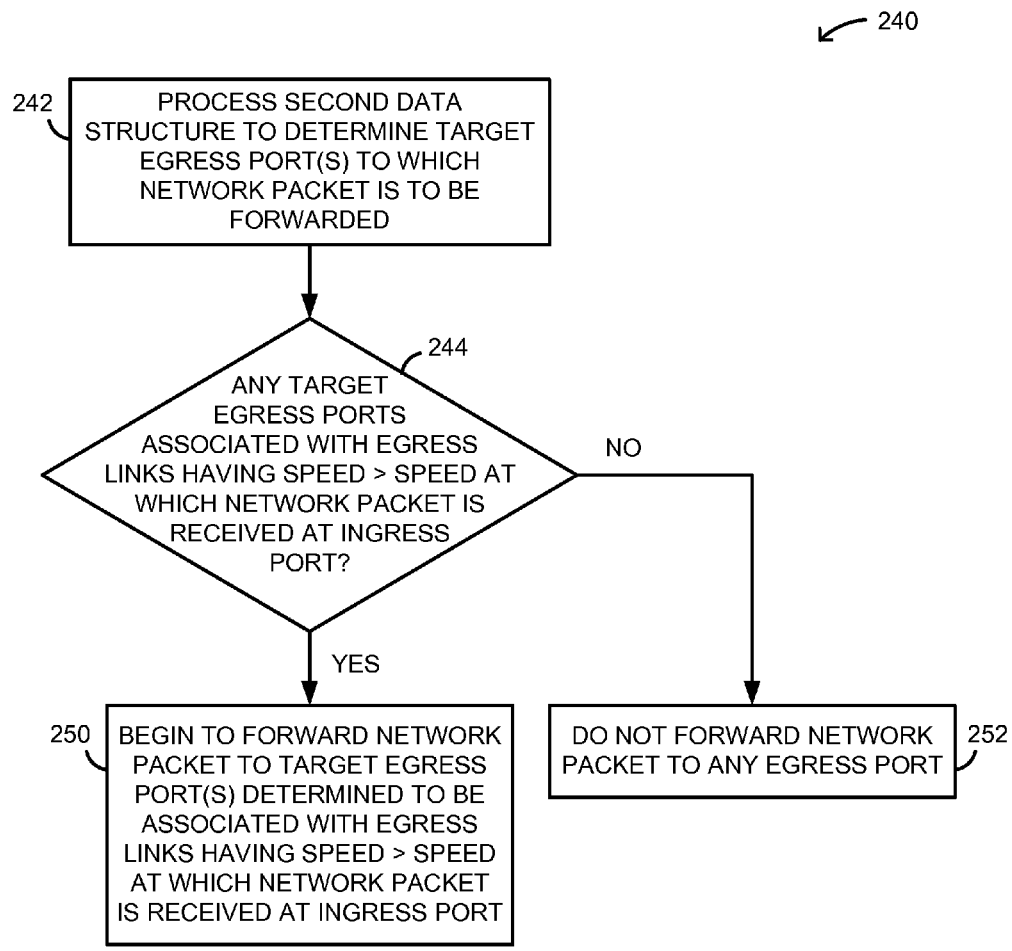
FIG. 5 is a flow diagram of an example method for processing a second data structure representing a network packet, and selectively forwarding or not forwarding the network packet, according to an embodiment.

FIGS. 4 and 5 provide additional detail with respect to the processing and forwarding blocks in the method 200 of FIG. 3, according to one embodiment. Whereas the method 200 corresponds to a particular scenario in which the network packet is forwarded to at least one egress port in response to processing the second data structure, however, FIGS. 4 and 5 show the selective nature of the forwarding, according to one embodiment, rather than a particular scenario.

Referring first to FIG. 4, the method 220 corresponds to blocks 206 and 210 in method 200 of FIG. 3, according to one embodiment. Specifically, blocks 222 and 224 correspond to at least a portion of block 206 of FIG. 3, and blocks 230 and 232 correspond to at least a portion of block 210 of FIG. 3, in an embodiment. At block 222, the first data structure (generated at block 204 of FIG. 3) is processed to determine one or more target egress ports to which the network packet is to be forwarded. At block 224, it is determined whether any of the one or more target egress ports determined at block 222 are associated with egress links having a speed that is less than or equal to the speed at which the network packet is received at the ingress port. If it is determined at block 224 that any of the target egress ports are associated with such egress links, and are therefore suitable for cut-through forwarding, flow proceeds to block 230. At block 230, forwarding to the target egress port(s) suitable for cut-through forwarding begins. If it is determined at block 224 that no target egress ports are associated with such egress links, flow proceeds to block 232. At block 232, the network packet is not forwarded to any egress port.

Referring next to FIG. 5, the method 240 corresponds to blocks 214 and 216 in method 200 of FIG. 3, according to one embodiment. Specifically, blocks 242 and 244 correspond to block 214 of FIG. 3, and blocks 250 and 252 correspond to block 216 of FIG. 3, in an embodiment. At block 242, the second data structure (generated at block 212 of FIG. 3) is processed to determine one or more target egress ports to which the network packet is to be forwarded. At block 244, it is determined whether any of the one or more target egress ports determined at block 242 are associated with egress links having a speed that is greater than the speed at which the network packet is received at the ingress port. If it is determined at block 244 that any of the target egress ports are associated with such egress links, and are therefore unsuitable for cut-through forwarding, flow proceeds to block 250. At block 250, forwarding to the target egress port(s) that are not suitable for cut-through forwarding begins. If it is determined at block 244 that no target egress ports are associated with such egress links, flow proceeds to block 252. At block 252, the network packet is not forwarded to any egress port.

Figure 6:
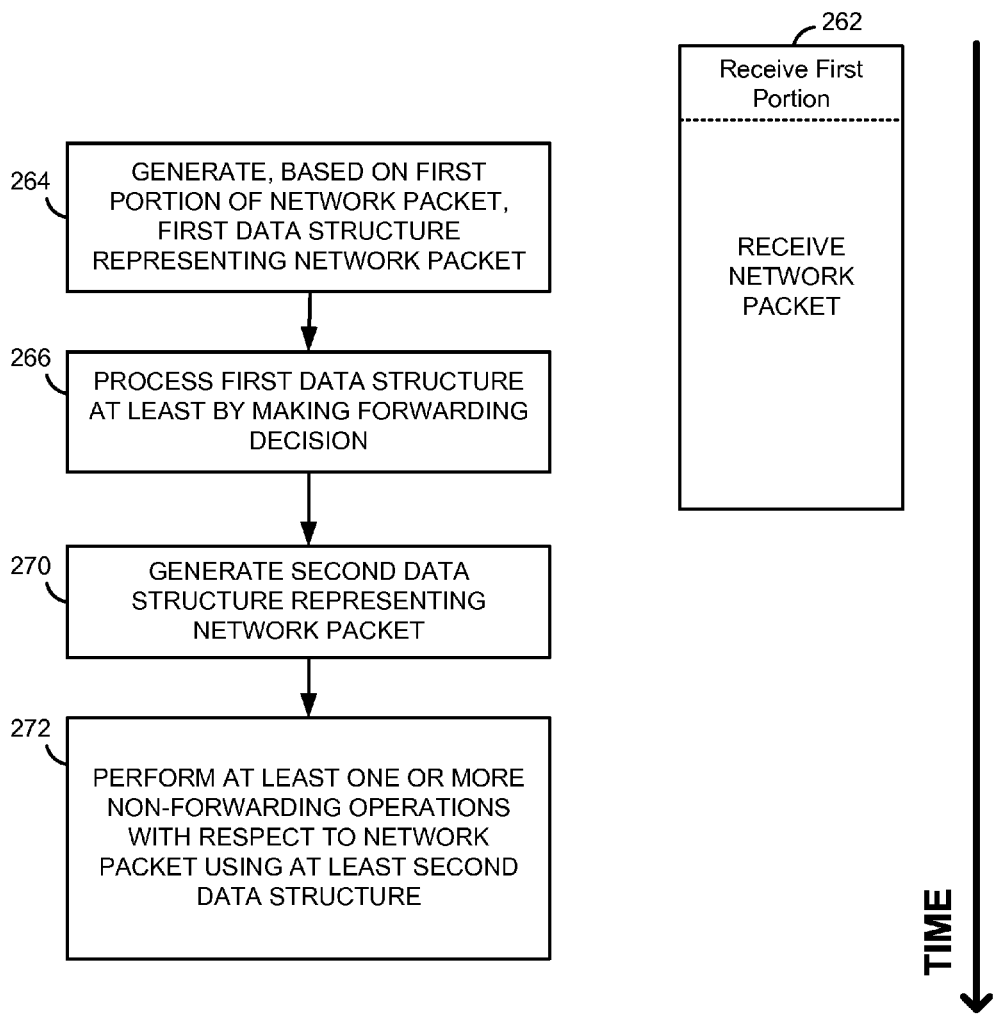
FIG. 6 is a flow diagram of another example method for processing network packets in a network device, according to an embodiment.

FIG. 6 is a flow diagram of another example method 260 for processing network packets in a network device, according to an embodiment. In an embodiment, the method 260 is implemented by network device 10 of FIG. 1. The vertical arrow on the right-hand side of FIG. 6 represents time, with time progressing in the downward direction. Despite being represented by distinct blocks, the operations corresponding to the blocks on the left-hand side of FIG. 6 are not necessarily distinct in time. In some embodiments, for example, the operation(s) of block 266 overlap with the operation(s) of block 270, etc.

At block 262, a network packet is received at an ingress port of the network device, such as ingress port 12 of FIG. 1, for example. In an embodiment, receiving the network packet includes writing the network packet (e.g., using a DMA) to a packet buffer, such as packet buffer 24 of FIG. 1, for example. Initially, a first portion of the network packet is received, which in various embodiments is a header of the network packet, a portion of a header, etc.

At block 264, a first data structure representing the network packet is generated based on the first portion (e.g., header) of the network packet received at the beginning of block 262. As seen in FIG. 6, in the embodiment of method 260, block 264 occurs after at least the first portion of the network packet has been received, but before the network packet has been completely received at the ingress port. In an embodiment, block 264 is implemented by a descriptor generator unit such as descriptor generator unit 100 of FIG. 2, for example. In some embodiments, block 264 is similar to block 204 of FIG. 3, described above.

At block 266, the first data structure generated at block 264 is processed at a packet processor at least by making a forwarding decision. As seen in FIG. 6, in the embodiment of method 260, block 266 occurs before the network packet has been completely received at the ingress port. In other embodiments, however, block 266 occurs after the network packet has been completely received, or partially before and partially after the network packet has been completely received. In some embodiments, block 266 is similar to block 206 of FIG. 3 and/or blocks 222 and 224 of FIG. 4, described above. In an embodiment, block 266 is implemented by a forwarding module such as forwarding module 102 of FIG. 2, for example.

At block 270, a second data structure representing the network packet is generated. As seen in FIG. 6, in the embodiment of method 260, block 270 occurs after the network packet has been completely received at the ingress port. In other embodiments, however, block 270 occurs before the network packet has been completely received, or partially before and partially after the network packet has been completely received. In an embodiment, block 270 is implemented by a descriptor generator unit such as descriptor generator unit 100 of FIG. 2, for example (e.g., a same descriptor generator unit that generated the first data structure at block 264, in an embodiment). In some embodiments, block 270 is similar to block 212 of FIG. 3, described above.

At block 272, at least one or more non-forwarding operations with respect to the network packet are performed using at least the second data structure generated at block 270. As seen in FIG. 6, in the embodiment of method 260, block 272 occurs after the network packet has been completely received at the ingress port. In an embodiment, block 266 is implemented by a non-forwarding module such as one of non-forwarding module(s) 104 of FIG. 2, for example. In one embodiment, the non-forwarding operation(s) include a counting operation with respect to the network packet, such as an operation that counts bytes in the network packet, or counts bytes in a payload of the network packet, etc. Additionally or alternatively, in an embodiment, the non-forwarding operation(s) include, but are not limited to, an error checking operation with respect to the network packet, such as an operation that analyzes a cyclic redundancy check (CRC) code of the network packet, and selectively mirrors, or selectively does not mirror, the network packet responsively to the error checking operation (e.g., only mirrors the network packet if the network packet contains no errors, in an embodiment).

In some embodiments, the one or more non-forwarding operations performed at block 272 using at least the second data structure are not performed when processing the first data structure (at block 262 or elsewhere). In one embodiment, for example, the processing at block 266 further includes detecting an indicator in the first data structure (e.g., a flag indicating that the first data structure is the first instance of a descriptor representing the network packet), and in response selectively not performing a byte counting operation with respect to the network packet, and block 272 includes detecting an indicator in the second data structure (e.g., a flag indicating that the second data structure is the second instance of a descriptor representing the network packet), and in response selectively performing the byte counting operation with respect to the network packet. In another example embodiment, the processing at block 266 further includes detecting an indicator in the first data structure, and in response selectively not performing an error checking (and/or mirroring) operation with respect to the network packet, and block 272 includes detecting an indicator in the second data structure, and in response selectively performing the error checking (and/or mirroring) operation with respect to the network packet.

In some embodiments in which a network device implementing the method 260 supports metering, processing the first data structure at block 266 includes not only making the forwarding decision, but also performing a check of a meter state to determine whether to drop the network packet or forward the network packet according to the forwarding decision. In one such embodiment, processing of the first data structure does not include updating a meter, regardless of whether the network packet is forwarded based on the meter check. Further, in one such embodiment, the one or more non-forwarding operations performed at block 272 include updating the meter that was checked at block 266. In an embodiment, the meter is updated based on a length (e.g., byte count) of the network packet. In some embodiments, the meter update is only performed at block 272 if the meter check at block 266 did not result in dropping the network packet (e.g., only if the network packet was forwarded according to the forwarding decision made at block 266, in one embodiment). In one embodiment, the meter state is not re-checked when processing the second data structure. In an embodiment, meter checking is performed at block 266 in response to detecting an indicator (e.g., flag value) in the first data structure, and meter updating is performed at block 272 in response to detecting an indicator (e.g., different flag value) in the second data structure.

In other embodiments in which a network device implementing the method 260 supports metering, processing the first data structure at block 266 does not include performing a check of the meter state, and the network packet is therefore forwarded according to the forwarding decision made at block 266 regardless of the meter state. In one such embodiment, the one or more non-forwarding operations performed at block 272 include updating the meter based on a length (e.g., byte count) of the network packet. In one embodiment, the meter state is not checked when processing either the first data structure or the second data structure. In an embodiment, meter operations are selectively bypassed at block 266 in response to detecting an indicator (e.g., flag value) in the first data structure, and meter updating is performed at block 272 in response to detecting an indicator (e.g., different flag value) in the second data structure.

In some of the metering embodiments described above, the method 260 corresponds to a scenario in which the network packet has been classified (e.g., at a block prior to block 264) as belonging to a traffic flow that has been configured as cut-through traffic (e.g., cut-through only traffic, or cut-through enabled traffic, etc.). In one such embodiment, other network packets that are instead classified as belonging to a traffic flow that has been configured as store-and-forward traffic (e.g., store-and-forward only traffic, or store-and-forward enabled traffic, etc.) are processed using only a single data structure, with standard metering operations (e.g., both meter checking and, if needed, a meter update) being performed for each network packet so classified.

In some embodiments, the method 260 includes other additional blocks not seen in FIG. 6. In one such embodiment, the method 260 includes an additional block in which the network packet is forwarded according to the forwarding decision made at block 266. In some embodiments, this additional block is similar to block 210 of FIG. 3 and/or block 230 of FIG. 4.

While various embodiments have been described with reference to specific examples, which are intended to be illustrative only and not to be limiting, changes, additions and/or deletions may be made to the disclosed embodiments without departing from the scope of the claims.

What is claimed is:

1. A method for processing network packets in a network device, the method comprising:
   receiving a network packet at an ingress port of the network device;
   after at least a first portion of the network packet has been received at the ingress port, but before the network packet has been completely received at the ingress port,
      generating, at the network device and based on the first portion of the network packet, a first data structure representing the network packet,
      processing the first data structure at a packet processor of the network device, and
      selectively beginning to forward the network packet to a first one or more egress ports of the network device, or selectively not forwarding the network packet to any egress port, responsively to processing the first data structure;
   before the network packet has been completely received at the ingress port, generating, at the network device, a second data structure representing the network packet; and
   after the network packet has been completely received at the ingress port,
      processing the second data structure at the packet processor, and
      selectively forwarding the network packet to a second one or more egress ports of the network device, different from the first one or more egress ports, responsively to processing the second data structure.

2. The method of claim 1, wherein:
   processing the first data structure includes determining one or more target egress ports to which the network packet is to be forwarded; and
   selectively beginning to forward the network packet to the first one or more egress ports, or selectively not forwarding the network packet to any egress port, is based at least in part on speeds of egress links associated with the target egress ports relative to a speed at which the network packet is received at the ingress port.

3. The method of claim 2, wherein the speeds of the egress links associated with the target egress ports are determined at least by one or both of (i) operational speeds of the target egress ports, and (ii) a destination of the first network packet.

4. The method of claim 1, wherein:
   processing the first data structure includes
      determining one or more target egress ports to which the network packet is to be forwarded, and
      determining which of the target egress ports, if any, are associated with egress links having a speed less than or equal to a speed at which the network packet is received at the ingress port; and
   selectively beginning to forward the network packet to the first one or more egress ports, or selectively not forwarding the network packet to any egress port, responsively to processing the first data structure includes beginning to forward the network packet only to those target egress ports, if any, that have been determined to be associated with egress links having a speed less than or equal to the speed at which the network packet is received at the ingress port.

5. The method of claim 4, wherein selectively forwarding the network packet responsively to processing the second data structure includes forwarding the network packet only to those target egress ports that have not been determined to be associated with egress links having a speed less than or equal to the speed at which the network packet is received at the ingress port.

6. The method of claim 4, wherein processing the second data structure is performed selectively in response to determining that the network packet has not yet been forwarded to all of the target egress ports.

7. The method of claim 1, further comprising:
based on a first indicator included in the first data structure, selectively not performing a first non-forwarding operation on the first data structure; and
based on a second indicator included in the second data structure, selectively performing the first non-forwarding operation on the second data structure.

8. The method of claim 7, wherein the first non-forwarding operation performed at least on the second data structure is an operation that at least one of (i) determines a byte count of the network packet, and (ii) determines whether the network packet contains errors.

9. The method of claim 7, wherein the first non-forwarding operation is either (i) a metering operation that utilizes at least a byte count of the network packet determined by the packet processor, or (ii) a mirroring operation that selectively mirrors, or selectively does not mirror, the network packet based on whether the network packet contains errors.

10. The method of claim 1, wherein receiving the network packet at the ingress port includes writing the network packet to a packet buffer configured to store the network packet during processing by the packet processor.

11. The method of claim 1, wherein one or both of:
generating a second data structure representing the network packet includes generating a second data structure comprising information about the network packet that was not included in the first data structure; and
processing the second data structure includes adding to the second data structure information about the network packet that was not included in the first data structure.

12. A network device comprising:
a plurality of ports, the plurality of ports including an ingress port configured to receive network packets from a network; and
a packet processor coupled to the plurality of ports, the packet processor comprising
a descriptor generator unit configured to
after at least a first portion of a first network packet has been received at the ingress port, but before the first network packet has been completely received at the ingress port, generate, based on the first portion of the first network packet, a first data structure representing the first network packet, and
before the network packet has been completely received at the ingress port, generate a second data structure representing the first network packet, and
a forwarding module configured to
before the first network packet has been completely received at the ingress port, (i) process the first data structure, and (ii) selectively begin to forward the first network packet to a first one or more egress ports of the plurality of ports, or selectively not forward the first network packet to any egress port, responsively to processing the first data structure, and
after the first network packet has been completely received at the ingress port, (i) process the second data structure, and (ii) selectively forward the first network packet to a second one or more egress ports of the plurality of ports, different from the first one or more egress ports, responsively to processing the second data structure.

13. The network device of claim 12, wherein the forwarding module is configured to:
process the first data structure at least by determining one or more target egress ports to which the first network packet is to be forwarded; and
selectively begin to forward the network packet to the first one or more egress ports, or selectively not forward the network packet to any egress port, based at least in part on speeds of egress links associated with the target egress ports relative to a speed at which the first network packet is received at the ingress port.

14. The network device of claim 12, wherein the forwarding module is configured to:
process the first data structure at least by
determining one or more target egress ports to which the first network packet is to be forwarded, and
determining which of the target egress ports, if any, are associated with egress links having a speed less than or equal to a speed at which the first network packet is received at the ingress port; and
selectively begin to forward the first network packet to the first one or more egress ports, or selectively not forward the first network packet to any egress port, responsively to processing the first data structure at least by beginning to forward the first network packet only to those target egress ports, if any, that have been determined by the forwarding module to be associated with egress links having a speed less than or equal to the speed at which the first network packet is received at the ingress port.

15. The network device of claim 14, wherein the forwarding module is configured to selectively forward the first network packet responsively to processing the second data structure at least by forwarding the first network packet only to those target egress ports that have not been determined by the forwarding module to be associated with egress links having a speed less than or equal to the speed at which the first network packet is received at the ingress port.

16. The network device of claim 14, further comprising:
a packet buffer configured to store network packets during processing by the packet processor,
wherein the descriptor generator unit is configured to generate the first data structure before the first network packet is completely written to the packet buffer, and
wherein the forwarding module is configured to process the first data structure and selectively begin to forward the first network packet to the first one or more egress ports before the first network packet has been completely written to the packet buffer.

17. The network device of claim 12, wherein the packet processor further comprises a non-forwarding module configured to:
based on a first indicator included in the first data structure, selectively not perform a first non-forwarding operation on the first data structure; and
based on a second indicator included in the second data structure, selectively perform the first non-forwarding operation on the second data structure.

18. The network device of claim 17, wherein the non-forwarding module is (i) a counting module configured to determine a byte count of the first network packet, (ii) a metering module configured to utilize at least the byte count of the first network packet as determined by the packet processor, or (iii) a mirroring module configured to selectively mirror, or selectively not mirror, the first network packet based on whether the first network packet contains errors.

19. The network device of claim 12, wherein either:
(i) the packet processor is a hardware packet processing pipeline, and the forwarding module is a stage of the hardware packet processing pipeline; or
(ii) the packet processor comprises one or more processors configured to execute machine-readable instructions, and the forwarding module is a module corresponding to instructions executed by the one or more processors.

20. A method for processing network packets in a network device, the method comprising:
receiving a network packet at an ingress port of the network device;
before the network packet has been completely received at the ingress port, generating, at the network device, a first data structure representing the network packet based on a received first portion of the network packet;
processing the first data structure at a packet processor of the network device, wherein processing the first data structure includes making a first forwarding decision for the network packet using the first data structure to forward the network packet to one or more egress ports;
for each of the one or more egress ports, selectively forwarding, or selectively not forwarding, the network packet to the respective egress port according to the first forwarding decision at least based on an operational speed of the respective egress port relative to the ingress port;
before the network packet has been completely received at the ingress port, generating, at the network device, a second data structure representing the network packet;
processing the second data structure at a packet processor of the network device, wherein processing the second data structure includes making a second forwarding decision for the network packet using the second data structure to forward the network packet to the one or more egress ports; and
for each of the one or more egress ports, selectively forwarding, or selectively not forwarding, the network packet to the respective egress port according to the second forwarding decision and an additional input.

21. The method of claim 20, wherein selectively forwarding, or selectively not forwarding, the network packet to the respective egress port according to the second forwarding decision and an additional input includes selectively forwarding, or selectively not forwarding, the network packet to the respective egress port according to the second forwarding decision and at least one of (i) an operational speed of the respective egress port relative to the ingress port and (ii) an indicator of which of the one or more egress ports, if any, the network packet was forwarded to according to the first forwarding decision.

* * * * *